United States Patent [19]

Kwarta

[11] Patent Number: 5,647,026
[45] Date of Patent: Jul. 8, 1997

[54] UNIFORMITY CORRECTION AND THRESHOLD OR HALFTONING CONVERSION UNIT AND METHOD

[75] Inventor: Brian J. Kwarta, Pittsford, N.Y.

[73] Assignee: Eastman Kodak Company, Rochester, N.Y.

[21] Appl. No.: 784,488

[22] Filed: Oct. 29, 1991

[51] Int. Cl.$^6$ ............................................. G06K 9/38
[52] U.S. Cl. ................................. 382/270; 358/457
[58] Field of Search ............................ 358/451, 457, 358/461; 382/50, 270, 299, 254, 274

[56] References Cited

U.S. PATENT DOCUMENTS

| | | | |
|---|---|---|---|
| 3,723,649 | 3/1973 | Pitegoff et al. | 358/406 |
| 3,800,078 | 3/1974 | Cochran et al. | 358/213.15 |
| 3,952,144 | 4/1976 | Kolder | 358/406 |
| 4,047,152 | 9/1977 | Giuliano et al. | 382/50 |
| 4,128,830 | 12/1978 | Weythman | 382/50 |
| 4,129,853 | 12/1978 | Althauser et al. | 382/50 |
| 4,251,837 | 2/1981 | Janeway, III | 358/455 |
| 4,339,774 | 7/1982 | Temple | 358/456 |
| 4,351,004 | 9/1982 | Choate et al. | 358/213.19 |
| 4,468,703 | 8/1984 | Fujiwara et al. | 382/51 |
| 4,486,781 | 12/1984 | Wilmer et al. | 358/163 |
| 4,491,963 | 1/1985 | Bellemare | 382/53 |
| 4,523,229 | 6/1985 | Kanmoto | 358/163 |
| 4,524,388 | 6/1985 | Abe et al. | 358/163 |
| 4,525,747 | 6/1985 | Sakai et al. | 382/53 |
| 4,547,811 | 10/1985 | Ochi et al. | 382/9 |
| 4,554,583 | 11/1985 | Saitoh et al. | 358/163 |
| 4,562,486 | 12/1985 | Suzuki et al. | 382/53 |
| 4,593,325 | 6/1986 | Kannapell et al. | 382/50 |
| 4,633,314 | 12/1986 | Kurata et al. | 358/163 |
| 4,686,579 | 8/1987 | Sakamoto | 358/457 |
| 4,723,174 | 2/1988 | Nishikawa et al. | 358/446 |
| 4,760,464 | 7/1988 | Sakano | 382/53 |
| 4,829,379 | 5/1989 | Takaki | 358/163 |
| 4,905,294 | 2/1990 | Sugiura et al. | 382/50 |
| 4,920,428 | 4/1990 | Lin et al. | 358/461 |
| 4,931,881 | 6/1990 | Matsui et al. | 358/466 |
| 4,941,188 | 7/1990 | Yamada | 382/50 |
| 4,961,117 | 10/1990 | Rumley | 358/461 |
| 4,980,778 | 12/1990 | Wittman | 358/446 |
| 5,014,332 | 5/1991 | Nakajima et al. | 382/50 |

*Primary Examiner*—Joseph Mancuso
*Attorney, Agent, or Firm*—Gordon M. Stewart

[57] ABSTRACT

The present invention is a system and method that performs a scaling and thresholding operation or a scaling and halftoning operation for each pixel from an image sensor in a single step. The system creates, depending on a mode selected, scaled threshold values or scaled dither matrix values from the scan of a reference document and a predetermined threshold or a predetermined dither matrix. The values are loaded into a single memory. The output of the memory is supplied to a comparator which compares the pixel data from the scanner sensor to the scaled threshold values or the scaled dither matrix values. The serial output of the comparator is converted into parallel data and stored for further processing.

2 Claims, 6 Drawing Sheets

UNIFORMITY CORRECTION AND THRESHOLD OR HALFTONING CONVERSION UNIT AND METHOD

CROSS REFERENCES TO PENDING RELATED APPLICATIONS

This application is related to U.S. Applications incorporated by reference herein and entitled Method And Apparatus For Image Data Resolution Conversion and Asynchronous, Noncontinuous Video Clock Apparatus, both by Brian J. Kwarta, both assigned to Eastman Kodak Company and having U.S. Ser. Nos. 07/784,350 and 07/784,332, respectively.

BACKGROUND OF THE INVENTION

Field of the Invention

The present invention is directed to a conversion unit for a document scanner which performs a conversion operation that combines either uniformity correction and thresholding or uniformity correction and halftoning (dithering) and, more particularly, to an apparatus and method that accomplishes these operations with a single memory unit and a single comparator by loading the memory unit with either uniformity corrected thresholds or a uniformity corrected halftoning (dither) matrix.

Description of the Related Art

Document scanners exist in a number of different types of devices, facsimile machines, optical character readers, photocopiers etc. in such scanners, a white reference document, mounted in the scanner unit adjacent the document scan window, is conventionally scanned by a light sensor array before the actual document is scanned. The scanning of the reference document is used to create a scale factor (sf) or correction factor or constant for each pixel in the sensor which is used to compensate for aging of the sensor, different background illumination levels, etc. These constants, which are stored in a constant storage as illustrated in FIG. 1, are used to correct or adjust the output of the sensor as the actual document is scanned. The correction is performed using a multiplier 12 to multiply the sensor output, which can be either digital or analog, by the scale factor. This is variously called uniformity correction or shading correction. Once the sensor output is corrected, it is conventionally compared, by a comparator 14, to a single constant threshold, from a threshold storage 16, or to a variable threshold (sometimes called a dither threshold or a halftone threshold) stored in a halftoning matrix storage 18 as selected by a selection unit 20 controlled by the user. The output of the comparator 14 is digital even though the inputs from the selection unit 20 or multiplier 12 can be analog or digital. When the corrected value from multiplier 12 is below the threshold, the output of the comparator 14 is set to a black pixel value (1) and when above the threshold to a white pixel value (0). The image can then be sent to an appropriate processing device for sending the image, if it is a facsimile machine, for reproducing a hard copy of the image, if it is a copier or for performing image recognition operations, if a scanner is for an optical character reader. Examples of prior art devices can be found in U.S. Pat. Nos. 3,800,078, 4,129,853, 4,491,963, 4,524,388, 4,633,314 and 4,980,778.

SUMMARY OF THE INVENTION

It is an object of the present invention to provide a combined scaling-thresholding operation or a combined scaling-dithering operation allowing improved efficiency in multipage document scanning.

It is another object of the present invention to provide a single memory used for both illumination correction or scaling, thresholding and halftoning.

It is a further object of the present invention to eliminate the need for a multiplier and the multiplication operation, thereby increasing multidocument scanning speed and reducing the cost of a document scanner.

It is also an object of the present invention to provide adjustable threshold or dither matrix values downloaded as desired from a host computer into a combined illumination correction threshold and halftoning memory.

The above objects can be attained by a system and method that creates a scaled threshold value or scaled dither matrix values and loads these values into a single memory. The output of the memory is supplied to a comparator which compares the pixel data from the scanner sensor to the scaled threshold values or the scaled dither matrix values. The serial binary output of the comparator is converted into parallel data and stored for further processing.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
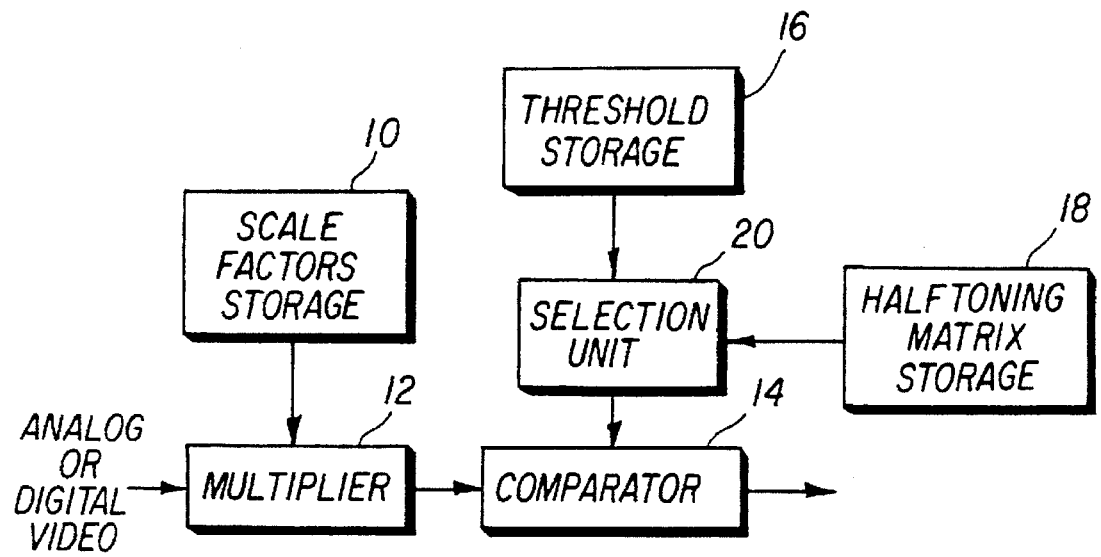
FIG. 1 illustrates a conventional illumination correction (scaling) operation followed by a conventional thresholding or halftoning operation.
Figure 2:
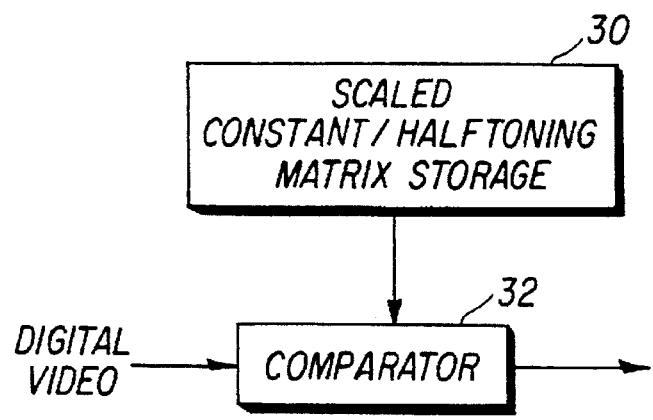
FIG. 2 is a block diagram of the components of the present invention.

The present invention eliminates the need for the multiplier 12 and the multiply operation of the prior art during the document scanning operation by storing a scaled constant or a scaled halftoning (dithering) matrix in a random access memory storage unit 30 as illustrated in FIG. 2. The contents of this storage unit 30 are output and compared to the image data by a comparator 32, thereby performing the scaling and thresholding or scaling and halftoning operation in a single operation.

Figure 3:
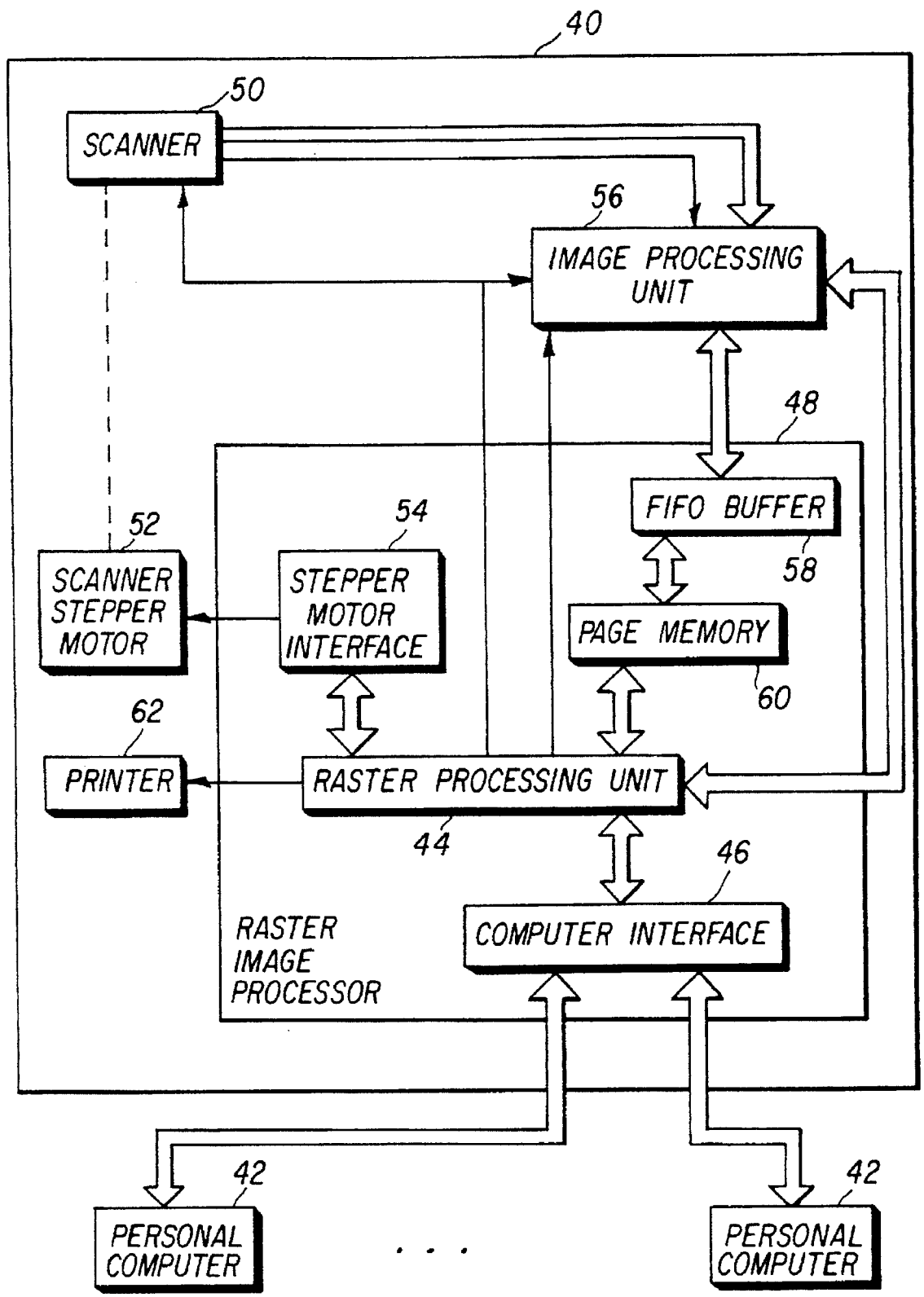
FIG. 3 illustrates the components of a typical scanner.

The present invention is part of a scanner apparatus 40 as illustrated in FIG. 3. The scanner apparatus 40 can be part of a printer, an electronic or optical copier, an optical character reader or a facsimile machine. A user at a personal computer 42 or some other type of device requests that a document be scanned by the scanner apparatus 40. This request is supplied to a raster processing unit 44 through an interface 46, both located in a raster image processor 48. The request indicates the resolution or dots per inch of the scanning operation. The resolution signal is supplied by the raster processing unit 44 to the image capture device or scanner 50. The raster processing unit 44 initiates the scanning operation which includes scanning the white reference document. The unit 44 also controls a stepper motor 52 through a conventional stepper motor interface 54. A contact array sensor in the scanner 50 samples at a constant resolution (for example, 3400 pixels per line) but the sensor is moved by the stepper motor 52 across the document at different speeds depending on the sampling resolution desired. At a resolution of 400 dots per inch (dpi) the stepper motor moves at 2 inches/second, while at 100 dots per inch it moves at 8 inches/second. The raster processing unit 44 also indicates the resolution of the scan to an image processing unit 56. The scanner 50 scans the white reference document and also scans the document to be digitized and supplies digitized pixel values to the image processing unit 56 along with a horizontal synchronization signal and pixel or video clock signals. The image processing unit 56 performs the resolution conversion, scaled thresholding or scaled dithering and supplies the converted data to the raster processing unit 44 through a first-in-first-out buffer 58 and a page memory 60. The page memory 60 should be large enough to hold a binarized converted image at 400 dots per inch and a 2 megabyte memory is recommended. For a grey scale image, which would require greater than 14 megabytes of memory for a 400 dpi 8 bit image of an 8.5 inch by 11 inch document, the document is scanned in sections consisting of 2 megabytes of data or less. That is, the present invention, which performs the scaled thresholding or scaled halftoning operations, is included in the image processing unit 56. Once the image is stored in memory 60 it can be output to the computer 42 or to a printer 62 included in the scanner apparatus 40. The printer prints at 300 dots per inch using a photodiode array and an electrostatic belt. The electrostatic belt can also be optically activated by a direct reflection of the document image onto the belt.

Figure 4:
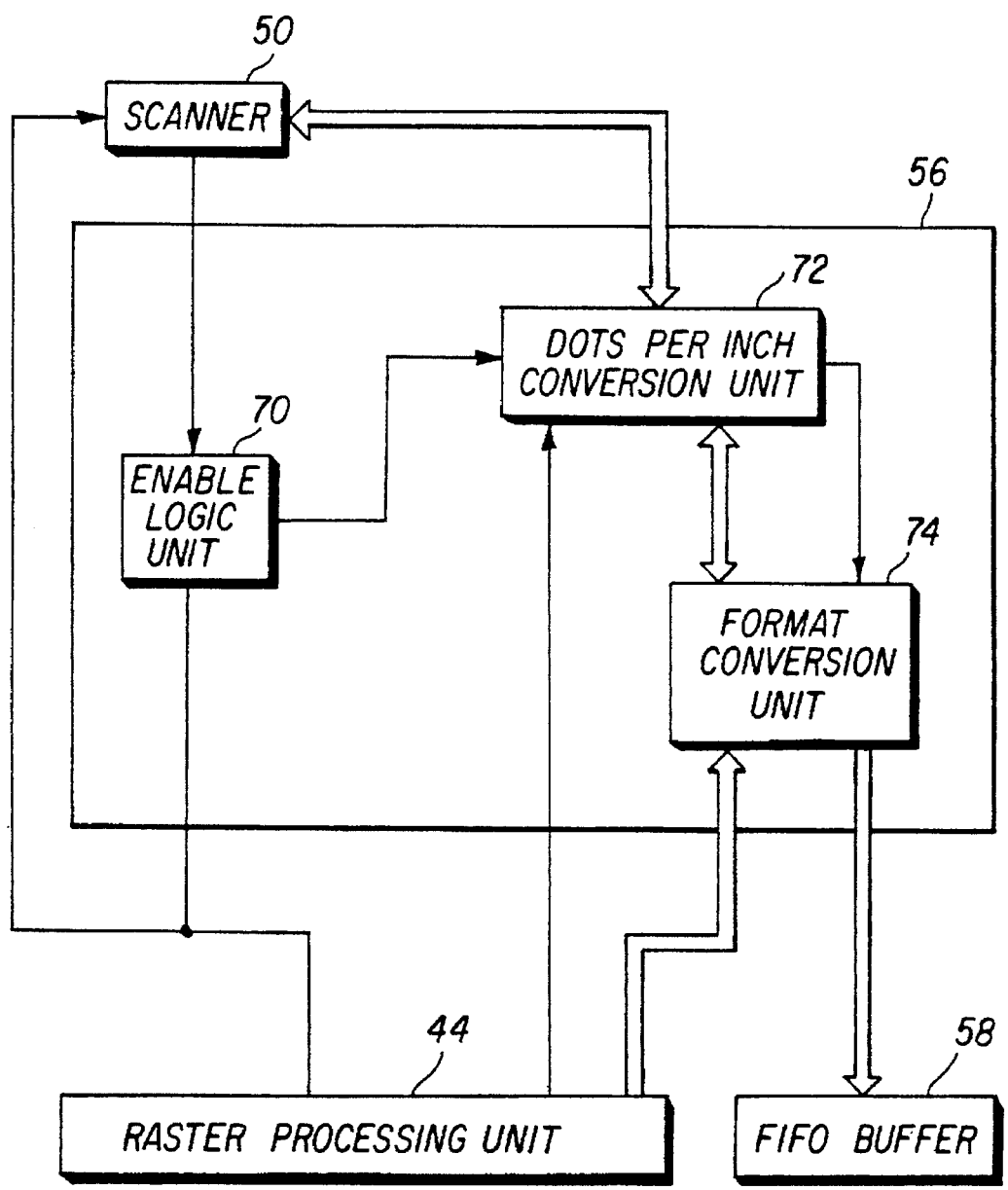
FIG. 4 illustrates the components of an image processing unit.

A more detailed illustration of the components included in the image processing unit 56 can be found in FIG. 4. The image processing unit 56 includes enable logic 70 which receives the horizontal synchronization and pixel clock signals from the scanner 50. The details of how the horizontal synchronization and pixel clock signals are produced can be found in the related clock apparatus application previously mentioned. The enable logic 70 based on an enable signal from the raster processing unit 44, supplies the pixel or video clock signal and horizontal synchronization signal to a dots per inch conversion unit 72. The enable signal is supplied when the raster processing unit 44 detects that the stepper motor 52 (and as a result the sensor) is in the desired position and the logic unit 70 then allows the pixel clock and horizontal synchronization signals to pass through to the dpi unit 72. The dots per inch conversion unit 72 converts the pixel data received from the scanner 50 into pixel data at the desired resolution. The details of the dpi conversion unit 72 can be found in the related Image Data Resolution Conversion application previously mentioned. The unit 72 supplies pixel data to a format conversion unit 74 (See FIGS. 5 and 6) along with the pixel clock and the horizontal synchronization signal. The format converted data, that is, the scaled, thresholded pixel data or the scaled, halftoned pixel data is supplied to the FIFO buffer 58. As will be discussed in more detail later, the scaled threshold values and the scaled dither matrix values are supplied to the format conversion unit 74 by the raster processing unit 44 along with the indicator which indicates whether grey, scaled-threshold binary or scaled-halftoned binary data should be produced by the format conversion unit.

Figure 5:
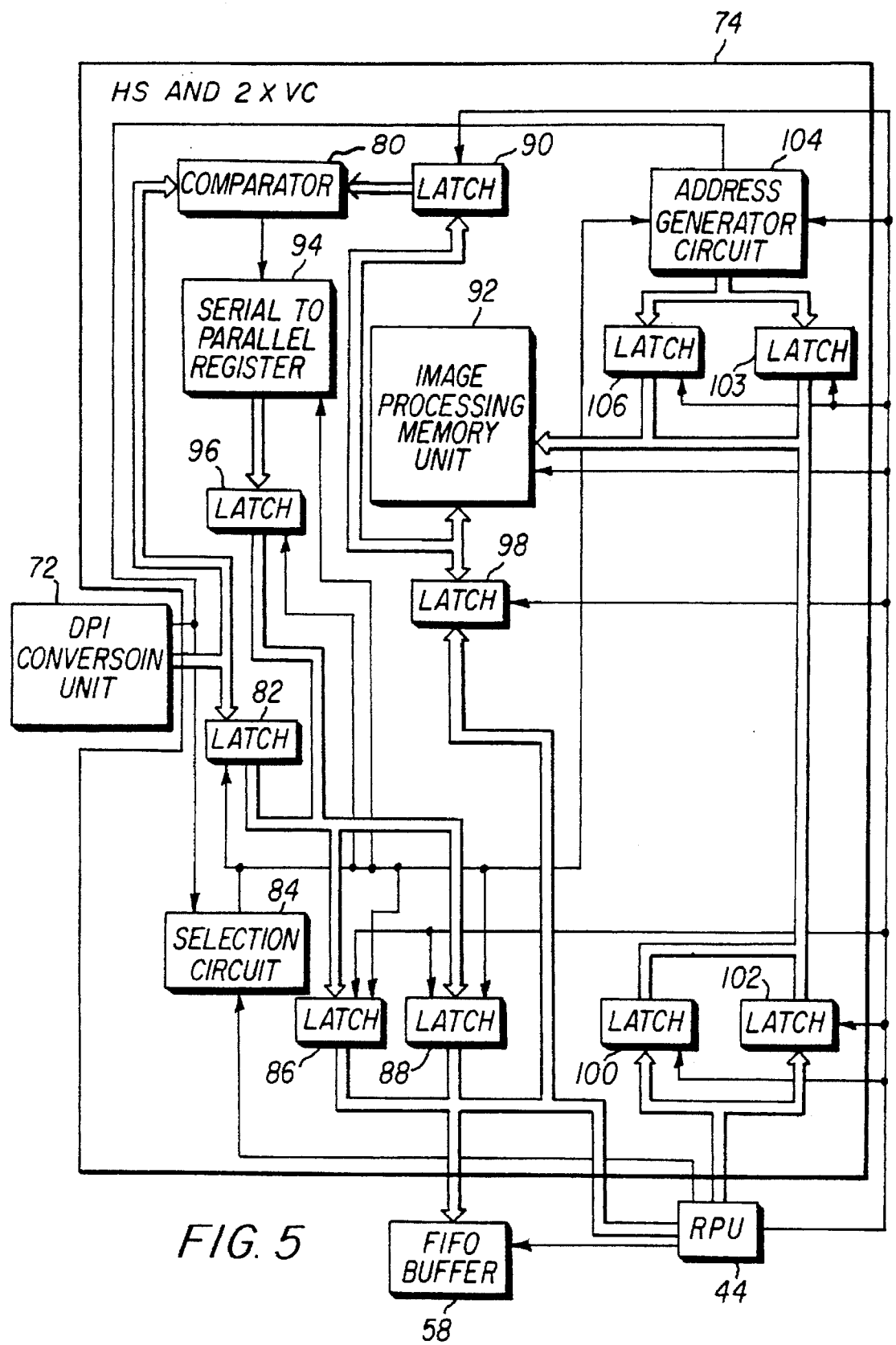
FIG. 5 is a block diagram of the components of the format conversion unit of FIG. 4.

The format conversion unit 74, as illustrated in FIG. 5, includes both a comparator 80 and a latch 82 which receive the pixel data at the desired resolution from the dpi conversion unit 72. If the format conversion unit 74 is requested to provide grey data, that is, raw pixel data at the desired resolution to the raster image processor 48, a selection circuit 84 (See FIG. 6) activates conventional latch 82 to store the incoming data. As the pixel clock from the conversion unit 72 clocks, the selection circuit 84 causes the contents of latch 82 to be alternately loaded into conventional latches 86 and 88. The contents of the latches 86 and 88 are then loaded into the FIFO buffer 58 by an appropriately timed signal from the selection circuit 84. If the pixel data from the dpi conversion unit 72 is to be scaled and thresholded or scaled and dithered, the latch 82 is not activated and the pixel data is compared by conventional comparator 80 to the contents of conventional latch 90. The latch 90 is loaded by an image processing memory unit 92. The image processing memory unit, which is preferably a conventional 32K by 8 static memory unit, includes either the scaled threshold values or the scaled dither matrix in accordance with the present invention. The scaled threshold value or the scaled dither value stored in latch 90 is compared by the comparator 80 and a single bit value is supplied to a serial to parallel register 94. When the conventional register 94 has converted sufficient pixel data values into the desired format (for example, 8 bits), a conventional latch 96 is loaded with the parallel data. The contents of the latch 96 is then loaded into latches 86 and 88 and therefrom into the FIFO buffer 58.

Prior to a format conversion scan, the raster processing unit 44 has loaded the image processing memory unit 92 with the scaled threshold values or the scaled dither matrix values through a conventional bidirectional latch 98. The locations into which the scaled threshold values or scaled dither matrix values are loaded is controlled by addresses supplied to the image processing memory unit 92 through conventional latches 100 and 102. The latches 100 and 102 are loaded by the raster processing unit 44. During the conversion operation, an address generation circuit 104, based on the horizontal synchronization and pixel clock signals from the conversion unit 72, produces the data addresses for the scaled thresholds or the scaled dither matrix. If the image processing memory unit 92 is loaded with scaled threshold values, the address generation circuit 104 supplies addresses through conventional latches 106 and 108, such that a scaled threshold constant for each pixel in a scan line, for the converted document at the desired resolution, is supplied to the image processing memory unit. That is, for each pixel a single scaled threshold is provided to the comparator 80. In practice, the thresholds are duplicated in the rows of the memory unit 92. The address generation circuit 104 essentially produces an incrementing column address which resets at the beginning of each new scan line and a row address which increments every scan-line. During the halftoning or dithering operation the address generation circuit 104 selects one of plural scaled halftoning values for each of the pixels. That is, a conventional dithering operation is performed in which the pixel value is compared with a position dependent set of thresholds, such that for each multibit pixel value the picture element value output by the register 94 is either set to white or black. For example, in an 8 by 8 dither matrix in which the first row includes dither values a, b, c, d, e, f, g, and h, the second row includes i, j, k, l, m, n, o and p, etc, the first scan line uses a*sf(0), b*sf(1), . . . , h*sf(7) in a repeating cycle and the second scan line uses i*sf(0), j*sf(1), . . . ,p*sf(7), etc. That is, the address circuit 104 produces an incrementing column address which resets to zero at the beginning of each scan line and a row address which increments at the beginning of each scan line until 8 rows have been traversed, at which point the row address resets to zero. If a 4 by 4 dither matrix is used it is replicated into the four positions of an 8 by 8 matrix allowing the same addressing operation to occur.

Figure 6:
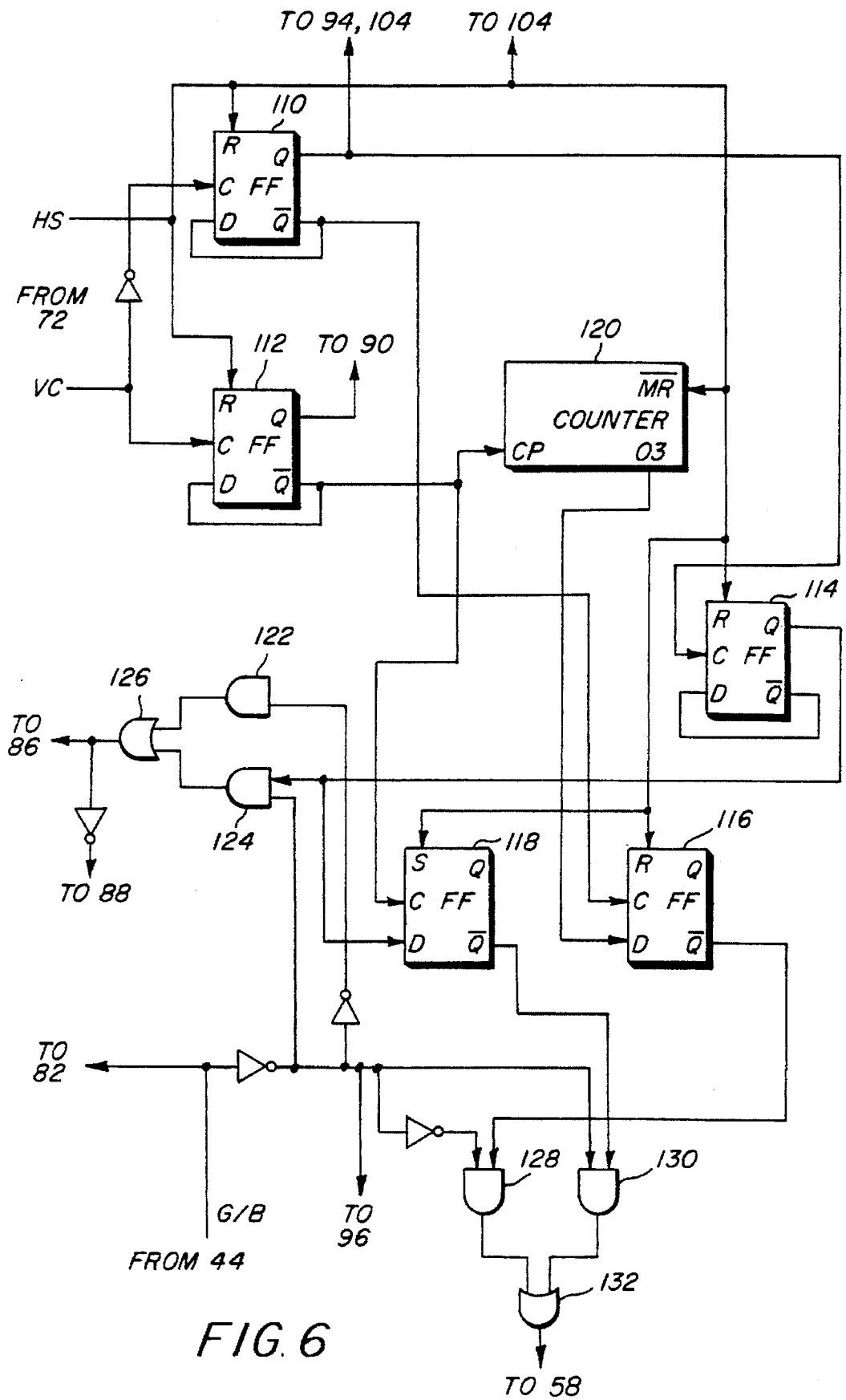
FIG. 6 depicts the details of the selection circuit 84 of FIG. 5.

The selection circuit 84, as illustrated in FIG. 6, includes flip flops 110 and 112 which produce opposite phases of the video or pixel clock signal and are reset by the horizontal synchronization signal. The flip flops 114, 116 and 118 receive these alternate phase signals and supply appropriate delayed signals. The counter 120 acts as a divider counting the bits stored in register 94. The AND gates 122 and 124, along with the OR gate 126, select the latches 86 and 88 responsive to a grey/binary signal from the raster processor 44 and the output of the counter 120 for binary mode, or from 2×VC divided by two through flip flop 114 for grey mode. The gates 128, 130 and 132 provide a strobe signal to FIFO buffer 58.

Figure 7:
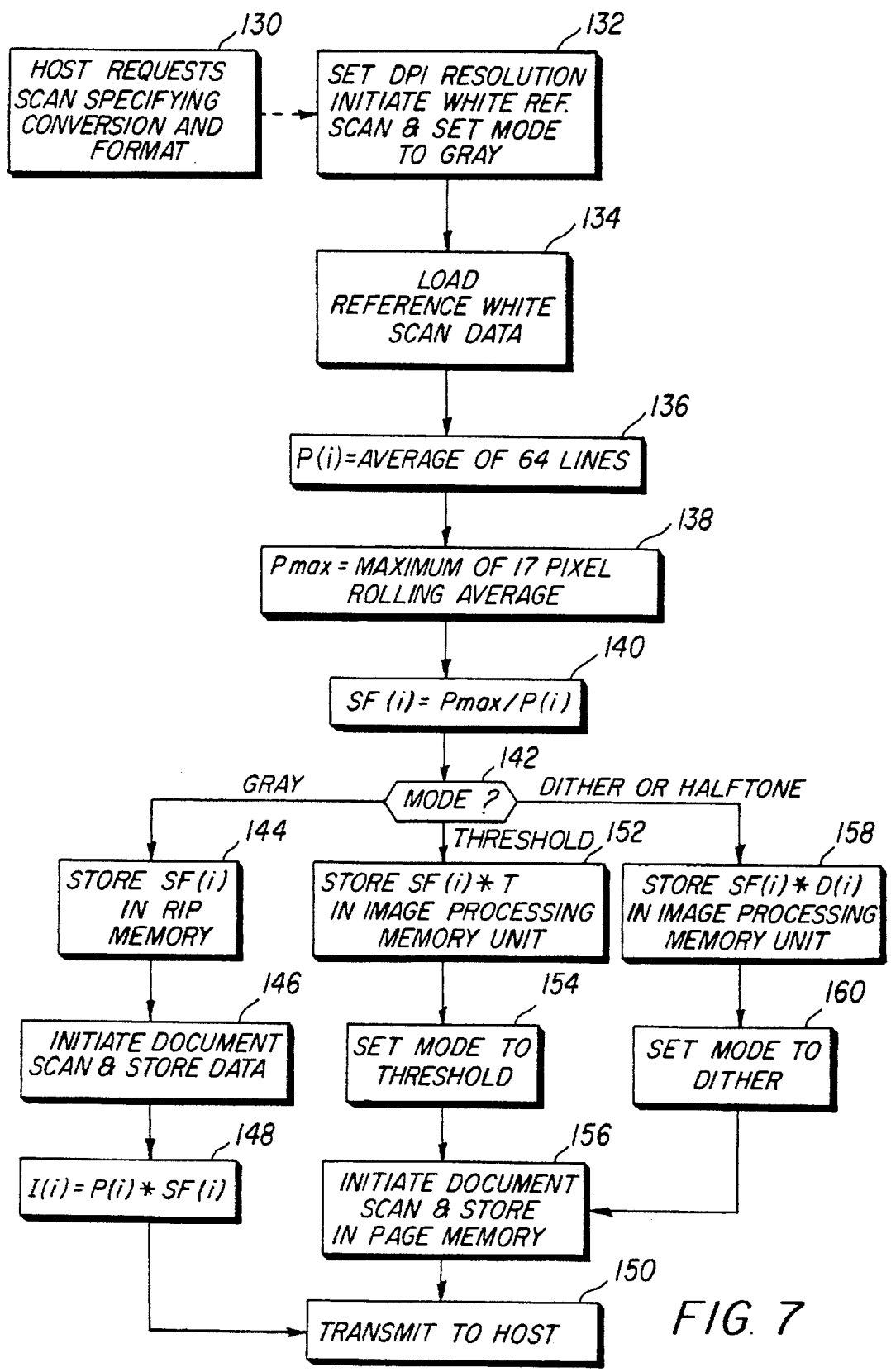
FIG. 7 is a flowchart of the operations associated with performing a conversion operation.

FIG. 7 illustrates the operations of the raster image processor 48 in conjunction with the scanner 50 and the image processing unit 56 including the format conversion unit 74. Initially the host device, such as the personal computer 42, requests 130 a document scan specifying a dots per inch resolution and a format. The raster image processor 48 based on this request sets 132 the dpi resolution to the requested resolution by providing a resolution indicator or signal to the scanner 50 and the image processing unit 56, initiates scanning of the white reference at the requested dpi resolution and the slowest motor speed, and sets the conversion mode for the format conversion unit 74 to grey. That is, the pixel data supplied by the scanner 50 and converted into the appropriate resolution by the dots per inch conversion unit 72 is to be supplied directly to the FIFO buffer 58 of the raster image processor 48 by the format conversion unit 74. Once the mode is set to grey, the scan occurs and the raster image processor 48 receives or loads 134 the pixel data from the scanning of the white reference document. Once the data for the scanning of the white reference document is loaded, the raster image processor 48 calculates an average value for each pixel which comprises an average of the pixel values in each position in the sensor for 64 scan lines of the white reference document. Once an average pixel value P(i) for the 64 lines is calculated, the processor 48 obtains 138 a maximum value (Pmax) of all the pixel averages by performing a 17 pixel rolling average across the line. The edges of the line can be ignored because the maximum value is known to be near the center of the 3400 pixels of the sensor. If desired, it is possible to perform the rolling averaging from pixels 850 to 2550 (in the 400 dpi mode) rather than across the entire scan line. Once Pmax is determined, the system calculates 140 a scale factor for each pixel sf(i)=Pmax/P(i). The system then determines 142 whether the user has requested a grey mode scan of the document to be scanned or a threshold scan or a dither scan.

If a grey mode scan is required, the processor 48 stores the scale factors in the raster image processor memory (not shown) and initiates the actual document scan. As the document is scanned the pixel values at the desired resolution are stored in the page memory 60. Once the pixel values for the page are stored, the raster image processor scales 148 the pixel values and then transmits 150 the scaled grey value image to the host computer 42.

If the user has requested a scaled thresholding operation, the raster image processor 48 multiplies 152 the scale factor for each pixel times the desired single threshold and stores the scaled thresholds in the image processing memory unit 92. The result stored in memory 92 is a constant threshold scaled by a variable scale factor. The raster image processor 48 then sets 154 the mode to convert (threshold) through the selection circuit 84. Document scanning is initiated and the scaled thresholded image values are stored in the page memory 60. The processor 48 then transmits 150 the format converted image to the personal computer host 42.

When a dither or halftone mode is specified by the user, the raster image processor 48 calculates 158 a scaled dither matrix and stores the scaled dither matrix in the image processing memory unit 92. The result stored in memory 92 is a variable threshold scaled by a variable scale factor. The dither matrix which is scaled can include any dither kernel desired. The system then sets 160 the mode to convert (dither or halftoning) through the selection circuit 84. The document scan is then initiated with the dithered image being loaded into page memory 60 and then transmitted to the host 42 by the raster image processor 48.

The many features and advantages of the invention are apparent from the detailed specification and thus it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of performing image data format conversion for pixels from a pixel sensor, comprising the steps of:
   (a) scanning a reference document and creating a scale factor for each pixel from the reference document scan;
   (b) creating, when a mode is threshold, a scaled threshold value for each pixel using a combined threshold and the scale factor for each pixel;
   (c) creating, when the mode is dither, a scaled dither matrix for each pixel using a combined dither matrix and the scale factor for each pixel;
   (d) scanning an actual document producing actual image data; and
   (e) comparing the actual image data to one of the scaled thresholds or the scaled dither matrix responsive to the mode and outputting format converted image data responsive to the comparison.

2. A method as recited in claim 1, further comprising the step of (f) outputting scaled image data using the scale factor for each pixel and the actual image data when the mode is not threshold and not dither.

* * * * *